(12) United States Patent
Voss et al.

(10) Patent No.: US 7,213,382 B2
(45) Date of Patent: May 8, 2007

(54) HEAT SEAL APPARATUS FOR LENS PACKAGES

(75) Inventors: Leslie A. Voss, Jacksonville, FL (US); Gregory S. Duncan, Gainesville, FL (US); Ravi S. Sanka, Jacksonville, FL (US); Gary S. Hall, Jacksonville, FL (US); Mark E. Schlagel, Jacksonville, FL (US); Michael F. Widman, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 73 days.

(21) Appl. No.: 11/120,045

(22) Filed: May 2, 2005

(65) Prior Publication Data

US 2005/0188650 A1    Sep. 1, 2005

Related U.S. Application Data

(60) Division of application No. 10/611,220, filed on Jul. 1, 2003, now abandoned, which is a continuation-in-part of application No. 09/217,878, filed on Dec. 21, 1998, now abandoned.

(60) Provisional application No. 60/394,398, filed on Jul. 8, 2002, provisional application No. 60/393,187, filed on Jul. 2, 2002.

(51) Int. Cl.
*B65B 7/28* (2006.01)
*B65B 51/10* (2006.01)

(52) U.S. Cl. .......................... 53/329; 53/64; 53/131.3; 53/329.2

(58) Field of Classification Search .................. 53/477, 53/484, 51, 64, 65, 267, 268, 329, 329.2, 53/341, 348, 131.3, 411; 156/64, 285; 100/264
See application file for complete search history.

(56) References Cited

U.S. PATENT DOCUMENTS

| | | | |
|---|---|---|---|
| 2,911,678 A | 11/1959 | Brunfeldt | |
| 3,140,573 A | 7/1964 | Buttolph | |
| 3,423,488 A | 1/1969 | Bowser | |
| 3,496,254 A | 2/1970 | Wichterle | |
| 3,660,545 A | 5/1972 | Wichterle | |
| 3,861,983 A | 1/1975 | Harrell | |
| 4,054,624 A | 10/1977 | Le Boeuf et al. | |
| 4,131,664 A * | 12/1978 | Flowers et al. | ............ 156/285 |
| 4,284,591 A | 8/1981 | Neefe | |
| 4,495,313 A | 1/1985 | Larsen | |
| 4,640,489 A | 2/1987 | Larsen | |
| 4,680,336 A | 7/1987 | Larsen et al. | |
| 4,691,820 A | 9/1987 | Martinez | |

(Continued)

FOREIGN PATENT DOCUMENTS

CN          98/32587 A2     7/1998

(Continued)

OTHER PUBLICATIONS

PCT International Search Report dated Nov. 2, 2006 for PCT Intl. Appln. No. PCT/US03/20724.

*Primary Examiner*—Louis Huynh (57) ABSTRACT

The present invention relates to an apparatus for packaging contact lenses. The apparatus includes a compliant head, improved heater and improved heat seal die.

13 Claims, 12 Drawing Sheets

U.S. PATENT DOCUMENTS

| | | |
|---|---|---|
| 4,761,069 A | 8/1988 | Truong et al. |
| 4,782,946 A | 11/1988 | Pollak |
| 4,889,664 A | 12/1989 | Kindt-Larsen et al. |
| 4,988,277 A | 1/1991 | Wichterle et al. |
| 4,989,393 A | 2/1991 | Sell et al. |
| 5,039,459 A | 8/1991 | Kindt-Larsen et al. |
| 5,094,609 A | 3/1992 | Kindt-Larsen |
| 5,200,121 A | 4/1993 | Hagmann et al. |
| 5,230,840 A | 7/1993 | Nishiguchi et al. |
| 5,271,875 A | 12/1993 | Appleton et al. |
| 5,294,379 A | 3/1994 | Ross et al. |
| 5,316,700 A | 5/1994 | Soye et al. |
| 5,476,111 A | 12/1995 | Andersen et al. |
| 5,490,959 A | 2/1996 | Nunez et al. |
| 5,528,878 A | 6/1996 | Edwards et al. |
| 5,561,970 A | 10/1996 | Edie et al. |
| 5,565,059 A | 10/1996 | Edwards et al. |
| 5,568,715 A * | 10/1996 | Ebel et al. ............... 53/54 |
| 5,573,108 A | 11/1996 | Hamilton et al. |
| 5,577,367 A | 11/1996 | Abrams et al. |
| 5,578,331 A * | 11/1996 | Martin et al. ............ 425/445 |
| 5,620,087 A | 4/1997 | Martin et al. |
| 5,620,088 A | 4/1997 | Martin et al. |
| 5,626,000 A | 5/1997 | Edwards et al. |
| 5,640,980 A | 6/1997 | Keene et al. |
| 5,644,895 A | 7/1997 | Edwards et al. |
| 5,649,410 A | 7/1997 | Martin et al. |
| 5,656,362 A | 8/1997 | Abrams |
| 5,674,347 A | 10/1997 | Edwards et al. |
| 5,675,962 A | 10/1997 | Martin et al. |
| 5,681,510 A | 10/1997 | Valint, Jr. et al. |
| 5,685,420 A | 11/1997 | Martin et al. |
| 5,687,541 A | 11/1997 | Martin et al. |
| 5,690,866 A | 11/1997 | Andersen et al. |
| 5,690,973 A | 11/1997 | Kindt-Larsen et al. |
| 5,697,495 A | 12/1997 | Abrams et al. |
| 5,698,047 A | 12/1997 | Keene et al. |
| 5,706,634 A | 1/1998 | Edwards et al. |
| 5,749,205 A | 5/1998 | Edwards et al. |
| 5,753,150 A | 5/1998 | Martin et al. |
| 5,762,081 A | 6/1998 | Keene et al. |
| 5,804,107 A | 9/1998 | Martin et al. |
| 5,842,325 A * | 12/1998 | Godly et al. ............ 53/411 |
| 5,914,074 A | 6/1999 | Martin et al. |
| 6,039,899 A | 3/2000 | Martin et al. |
| 6,413,334 B1 * | 7/2002 | Rittner et al. .......... 156/64 |

FOREIGN PATENT DOCUMENTS

| | | |
|---|---|---|
| CN | 08710234 | 10/2001 |
| EP | 0183324 A2 | 6/1986 |
| EP | 0227365 B1 | 1/1987 |
| EP | 0318164 A2 | 5/1989 |
| EP | 0 582 461 B1 | 2/1994 |
| EP | 0 680 880 A1 | 11/1995 |
| EP | 0 741 078 A | 11/1996 |
| EP | 0 741 079 A | 11/1996 |
| EP | 0855264 A1 | 7/1998 |
| GB | 1092749 A | 11/1967 |
| GB | 1 459 094 | 12/1976 |
| GB | 1516194 A | 6/1978 |
| GB | 2235406 A | 3/1991 |
| JP | 61-172711 A | 8/1986 |
| JP | 11020035 A | 1/1999 |
| WO | 96/24074 | 8/1996 |
| WO | 97/34806 A1 | 9/1997 |
| WO | WO 98/32587 * | 7/1998 |
| WO | 98/42497 | 10/1998 |

* cited by examiner

HEAT SEAL APPARATUS FOR LENS PACKAGES

CROSS REFERENCE TO RELATED APPLICATIONS

This application is a DIV of U.S. application Ser. No. 10/611,220 filed Jul. 1, 2003, now abandoned; which is a CIP of U.S. application Ser. No. 09/217,878 filed Dec. 21, 1998, now abandoned.

This application is a divisional application of U.S. application Ser. No. 10/611,220, filed Jul. 1, 2003, now abandoned, which claims the benefit of U.S. Provisional Application Ser. No. 60/393,187 filed on Jul. 2, 2002 and U.S. Provisional Application Ser. No. 60/394,398 filed on Jul. 8, 2002.

This application is a DIV of U.S. application Ser. No. 10/611,220 filed Jul. 1, 2003, now abandoned; which is a CIP of U.S. application Ser. No. 09/217,878 filed Dec. 21, 1998, now abandoned; is related to U.S. application Ser. No. 09/818,725 filed Mar. 27, 2001, now U.S. Pat. No. 6,695,988; and is related to U.S. application Ser. No. 10/417,936 filed Apr. 17, 2003; all of which are incorporated herein by reference.

FIELD OF THE INVENTION

The present invention relates to an apparatus for heat sealing containers containing an ophthalmic contact lens to form a sealed package. More specifically, the present invention relates to an apparatus for heat sealing a lidstock to a lens container to form a package by controlling the application of heat and pressure for each lid and container assembly.

BACKGROUND OF THE INVENTION

In the manufacture of hydrophilic ("soft") ophthalmic contact lenses, it is conventional to package each manufactured lens in a disposable package for containing a single lens and predetermined amount of liquid (generally buffered saline). Typically, the lens and liquid are introduced to a cavity or well in a container. The container is usually formed from a thermoplastic (e.g., molded polypropylene or polystyrene). After the lens and liquid are placed into the container, the container is sealed by applying a foil strip to the top of the container to form a lid and heat sealing the strip to the top of the container to form a package. The heat sealed package containing both the lens and liquid is then subjected to further processing, including for example, sterilization.

Conventional apparatus used for the high speed packaging of contact lenses on an assembly line is designed to permit inspection and packaging of several contact lenses simultaneously. Typically, a plurality (generally 6, 8 or 10) of containers are mounted in a fixed carrier rack having a cavity for receiving each container. A contact lens and liquid are introduced to each container mounted on the rack. The rack of containers is then conveyed to an inspection station where each container is inspected to ensure that a contact lens is present and not defective. The rack then moves onto a platen in a heat sealing station where a preformed sheet of foil stock is positioned over the rack of containers. A heated mandrel is then applied to the rack to apply predetermined heat and pressure for a predetermined time, thereby heat sealing the foil stock to each container and forming sealed packages. As a result, each of the containers is now each heat sealed to the sheet of foil stock and is accordingly joined together to form multi-package arrays. The foil stock is provided with perforations to permit the packages to be separated from each other after further downstream processing and/or shipping.

The packaging approach described above presents several disadvantages. For example, by providing a plurality of lens containers on each rack, the detection and identification of a defective or missing lens on the rack at the inspection station is complicated. A complex matrix tracking system must be employed to identify which container or containers on the rack has failed inspection and track them through the process until they can be removed.

Another problem inherent in processing multiple containers simultaneously in a fixed rack arrangement is that each container on the rack is subjected to identical heat sealing conditions. Due to variations in the molding process, the molded thermoplastic containers sometimes vary in height. In such an event, a container of non-standard height may be subjected to either too little pressure (if too short) or too much pressure (if too tall) compared to the pressure experienced by a container of standard height. As a result, the heat seal formed on one or more of the array of packages joined together by the perforated foil sheet may be of unacceptable quality. One defective heat seal in the array will require that the entire array of packages be discarded, and, thus, an entire production lot may be subject to further testing for heat seal failures, which, if present, may require rejecting the entire production lot.

Finally, in the prior art heat sealing apparatus, the sheet of perforated foil stock is positioned over the rack of containers upstream of the heated mandrel station. This arrangement relies on gravity and friction to maintain the lidstock in position until the heat seal is formed. Slight lateral movement of the foil stock causes mis-registration of the stock on the set of containers and could result in a defective set of packages.

The apparatus described above is disclosed in U.S. Pat. No. 5,687,541 issued to Martin et al. Other packages and packaging apparatus systems are disclosed in U.S. Pat. No. 5,649,410 issued to Martin et al., U.S. Pat. No. 5,561,970 issued to Edie et al., U.S. Pat. No. 5,094,609 issued to Kindt-Larsen, U.S. Pat. No. 4,691,820 issued to Martinez, U.S. Pat. No. 5,620,087 issued to Martin et al., U.S. Pat. No. 5,749,205 issued to Edwards et al. and U.S. Pat. No. 5,577,367 issued to Abrams et al. Each of the references cited herein are incorporated by reference. In the event of conflict in the meaning or interpretation of the present specification and/or appended claims, the present specification controls.

It will be apparent that there continues to be a need for an apparatus capable of detecting and selectively removing failed containers. In addition, the need exists for a heat sealing apparatus capable of applying a predetermined amount of pressure to each container in a group of containers being sealed simultaneously. Finally, there is a need for a heat sealing apparatus that is capable of maintaining a sheet of lidstock in registration with the set of containers during heat sealing. There is also a need for a sealing apparatus that is sensitive to angular irregularities in container heights, and discrepancies in the planes of the platen and the surfaces of the heat seal dies, and one that can provide for more consistent heating of the heat seal dies. The present invention addresses these needs.

SUMMARY OF THE INVENTION

The present invention relates to an apparatus for packaging contact lenses. The apparatus includes a plurality of discrete lens carriers and a plurality of contact lens containers. The carriers are movable within the apparatus. A single one of the containers is mounted on a single one of the carriers.

The present invention also relates to an apparatus for automatically packaging contact lenses that includes a plurality of lens carriers, a plurality of lifts, a plurality of contact lens containers and either a plurality of platens and/or a plurality of mandrels. One of the containers is mounted on a respective one of the carriers. Each of the platens and/or each of the mandrels is individually supported by one of the lifts. The lifts apply pressure, within a predetermined range, to each of the containers.

The present invention also relates to an apparatus for automatically packaging contact lenses that includes a plurality of contact lens containers. A heated mandrel is disposed above the plurality of containers. The heated mandrel is preferably moveable between a retracted position above the plurality of containers and an engaged position immediately adjacent to the plurality of containers. A lidstock is selectively movable between a retracted position and an inserted position. The inserted position is between the heated mandrel and the plurality of containers, whereby in the inserted position the lidstock is fixedly held in position at least until the heated mandrel contacts the lidstock while moving to the engaged position.

The present invention also relates to an apparatus for packaging contact lenses that includes a lidstock having indicia printed thereon. The lidstock is fed from a roll under tension. A vision alignment inspection system checks the print quality on the lidstock and simultaneously checks for registration of the lidstock within the apparatus.

In another aspect, the present invention relates to an apparatus for packaging ophthalmic hydrophilic contact lenses transported along a conveyor, each lens contained within a container supported by a carrier. The apparatus includes a conveyor for conveying carriers each supporting a container, each container including a well for containing a contact lens and preferably a heat sealing surface. The apparatus also includes a plurality of platens, each of the platens attached to a lift capable of independently exerting a preset pressure against the mandrel (and the container between the platen and mandrel). Each platen receives a single carrier. Preferably there is one transducer, which generates an electrical signal corresponding to the pressure that operates on the cylinders to assure that it is within prescribed limits. A heated mandrel is disposed above the platens. The mandrel is movable from a disengaged position to an engaged position. A lidstock inserter capable of inserting a lidstock between the mandrel in the disengaged position and the heat sealing surfaces of the containers positioned above the plurality of platens is provided. The inserter preferably holds the lidstock in place until the mandrel contacts the lidstock against the container. In addition, a signal processor is provided, capable of receiving the pressure signal from the transducer, comparing the signal to a set of predetermined values, and marking the array for rejection if the pressure exerted by the lift is outside the predetermined range.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PREFERRED EMBODIMENTS

Figure 1:
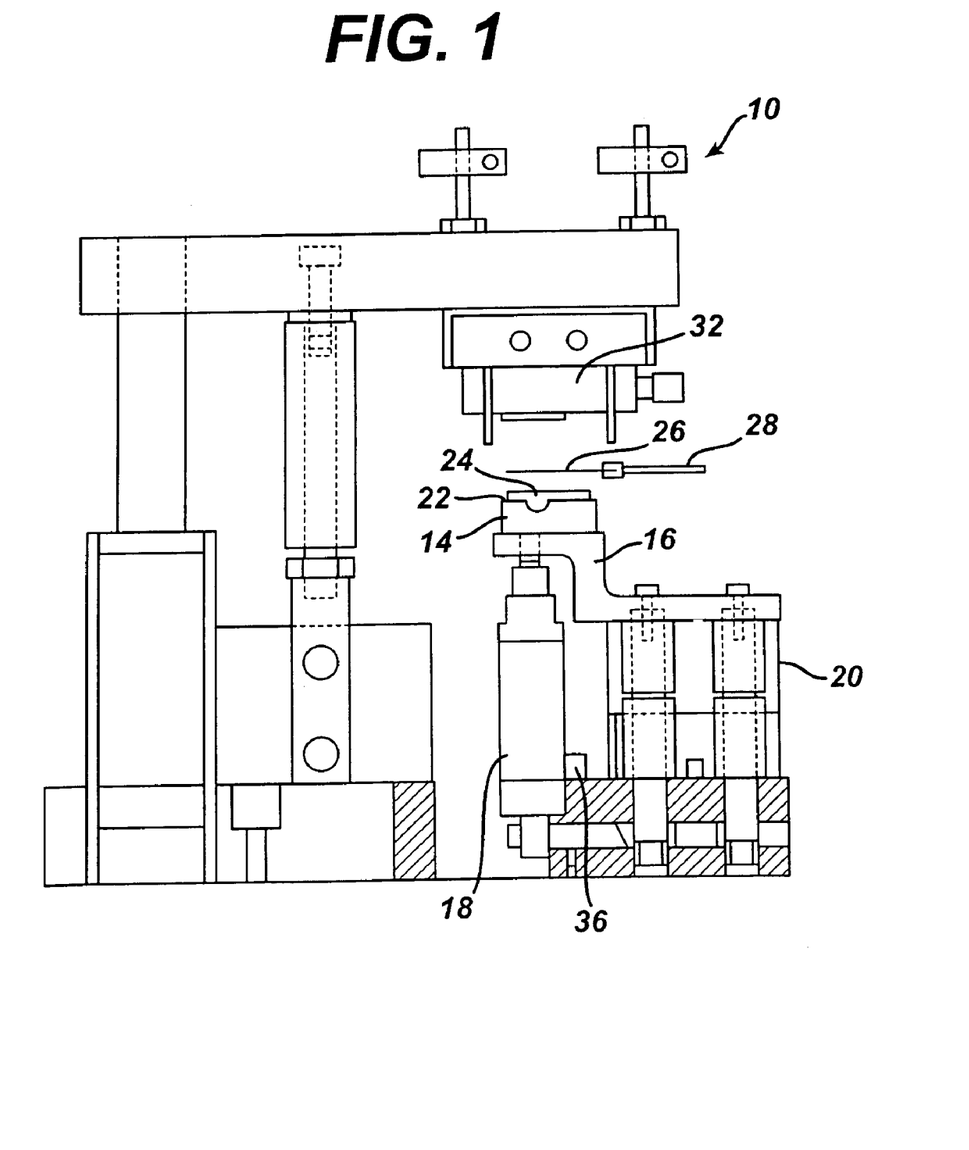
FIG. 1 is a side elevation view of the heat sealing apparatus according to the present invention.
Figure 2:
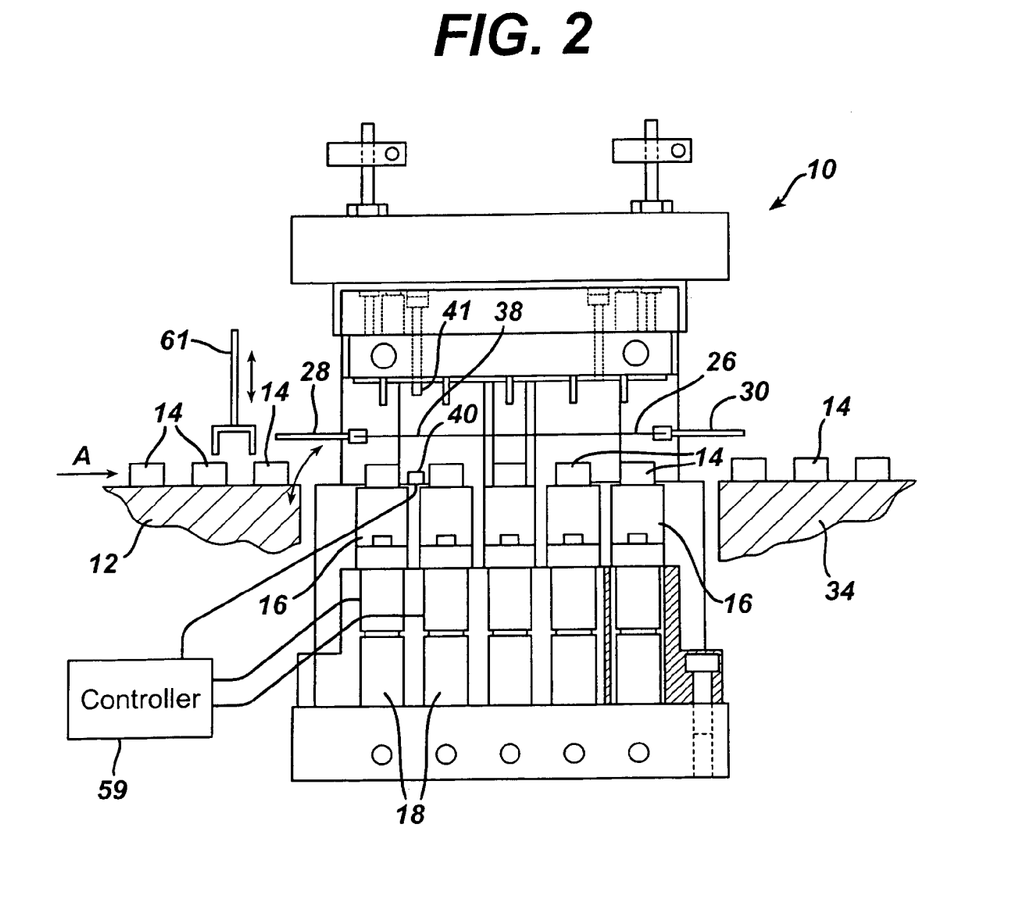
FIG. 2 is a front elevation view of the heat sealing apparatus illustrated in FIG. 1.
Figure 4:
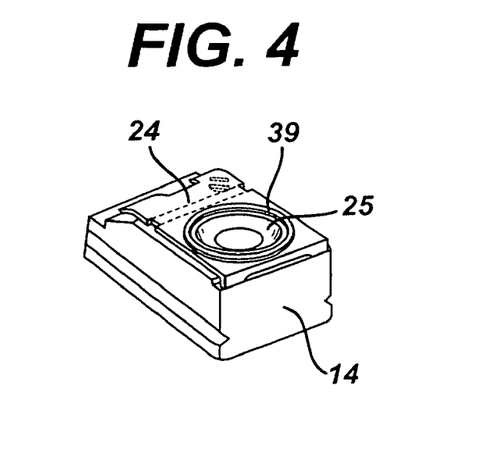
FIG. 4 is a perspective view of a contact lens carrier with a contact lens container received thereon.

Referring now to FIGS. 1 and 2, side and front elevation views of a heat seal apparatus 10 for sealing a lidstock onto a container to form a sealed contact lens package are illustrated. The apparatus includes an upstream conveyor 12 capable of conveying a plurality of individual lens carriers 14 (FIG. 4), in the direction indicated by arrow A in FIG. 2, into the heat seal apparatus 10.

As illustrated in FIG. 2, in the heat seal apparatus 10, each individual carrier 14 is positioned above a discrete support platen 16. Each platen 16 is supported by a lift, e.g., a hydraulic or pneumatic (i.e., fluid) cylinder 18 which is operative to vertically displace the respective platen and by a bearing block 20.

Figure 3:
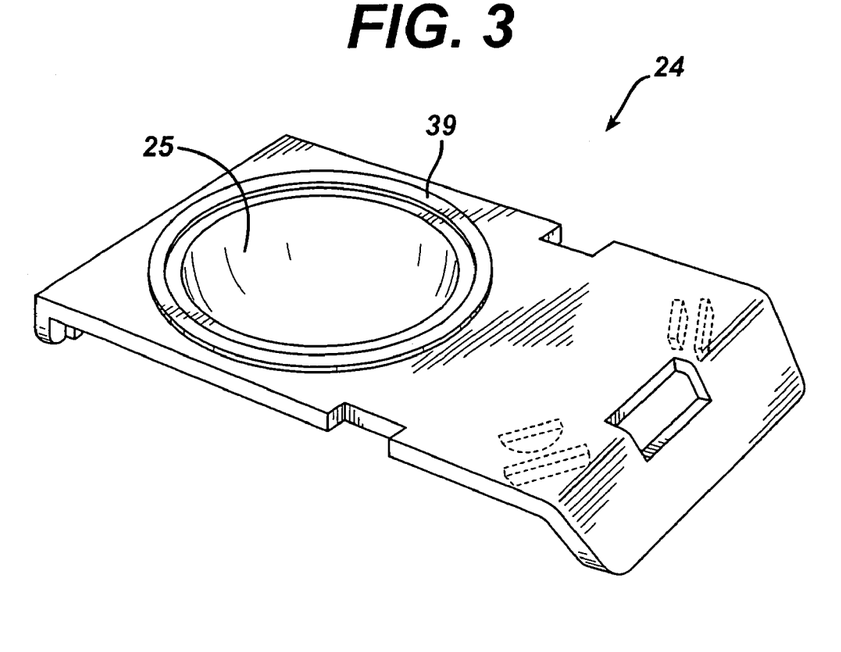
FIG. 3 is a perspective view of a contact lens container.

Each individual lens carrier 14 supports, on its upper surface 22, a lens container 24, which contains a contact lens in a cup-shaped recess or well 25. The containers can be a portion of the mold, e.g., the front cure mold and/or the bottom half of a contact lens package, which is conventionally referred to as the bowl. Preferably, the container is a bowl. Referring now to FIG. 3, container 24 includes a sealing flange 39, which is disposed about cup-shaped recess 25. The individual lens carriers 14 are incrementally moved into position in the heat sealing assembly such that one lens carrier 14 is placed upon each of the platens 16. As illustrated in FIG. 2, the heat seal assembly includes, in one illustrative embodiment, five platens which each receive a single lens carrier holding a container. However, in the currently preferred exemplary embodiment, the heat seal assembly includes six platens. Once the set of lens carriers are in position, with each carrier supporting a container 24 thereupon, a lidstock sheet 26 is moved into position between a heated mandrel 32 of the heat seal apparatus and the containers 24. Lidstock 26 is preferably in the form of a foil lid stock, which is preferably pre-perforated in a conventional manner at a location corresponding to a location between each individual lens carrier 14. The foil sheet is typically a laminate of aluminum foil and a thermoplastic film, such as a polyethylene. Lidstock 26 is preferably held by a foil maneuvering mechanism which includes a pair of gripping fingers 28, 30. The fingers selectively move lidstock 26 from a retracted position (not shown) to the inserted position (see FIGS. 1 and 2). Preferably, the lidstock is held in position over the containers at least until the heated mandrel contacts the lidstock to the surface of the container at which time the fingers let go of the lidstock and return to the retracted position. In another embodiment, the fingers can hold the lidstock in place until the heat sealing step is complete. The heated mandrel 32 is selectively movable from an upper, non-engaging position, as illustrated in FIGS. 1 and 2, to a lower engaged position, thereby applying heat and pressure to a predetermined portion of the lidstock 26 positioned over the container for a predetermined time to create a heat seal and form a sealed package. More specifically, lidstock 26 is heat sealed to the annular flanges 39 of each of the respective containers 24. Thereafter, the heated mandrel 32 is raised back up to the upper, non-engaging position. The individual lens carriers 14, which each now carry a sealed package (i.e., a container 24 heat sealed to foil lidstock 26) joined by the foil sheet to the adjoining packages to form a set of packages, are next advanced to a downstream conveyor 34 for further processing, in a manner which is known to those skilled in the art. In the preferred mode, six (6) containers are sealed in each step, with two lidstock strips covering three packages each.

Each cylinder 18 is in fluid communication with one or more pressure transducers 36 to measure the pressure that is applied by the heated mandrel 32 against the container when mandrel 32 is moved to the lower, engaged position. The heat seal apparatus 10 further includes a controller 59 electrically connected to the one or more pressure transducers and to the individual cylinders, and is programmed with the acceptable predetermined range for the pressures to be exerted in forming the heat seal. The controller preferably comprises a processor or computer programmed to receive the electrical signals from the one or more pressure transducers, determines the pressure applied to the respective packages 24, and, if necessary, controls one or more of the cylinders 18 to increase or decrease the pressure applied to that container. Preferably, the pressure applied by the heated mandrel 32 against the containers 24 is within the predetermined range. The range can be determined by those skilled in the art depending on the material used for package 24, lidstock 26 and their respective thickness to ensure that a proper seal is achieved. Because of the tolerances in the thickness of the sealing flange 39 on the container 24 and the thickness of the lidstock 26, by applying the heated mandrel to an individually supported lens carrier at a pressure maintained within the predetermined range, the present invention ensures that the proper pressure is applied to each container so that lidstock 26 is properly sealed to container 24 in the set. Thus, in the event one of the pressure transducers senses a pressure out of the predetermined range, the corresponding cylinder is controlled to either rise or descend to increase or decrease respectively, the pressure applied to that container to ensure a proper heat seal.

Figure 6:
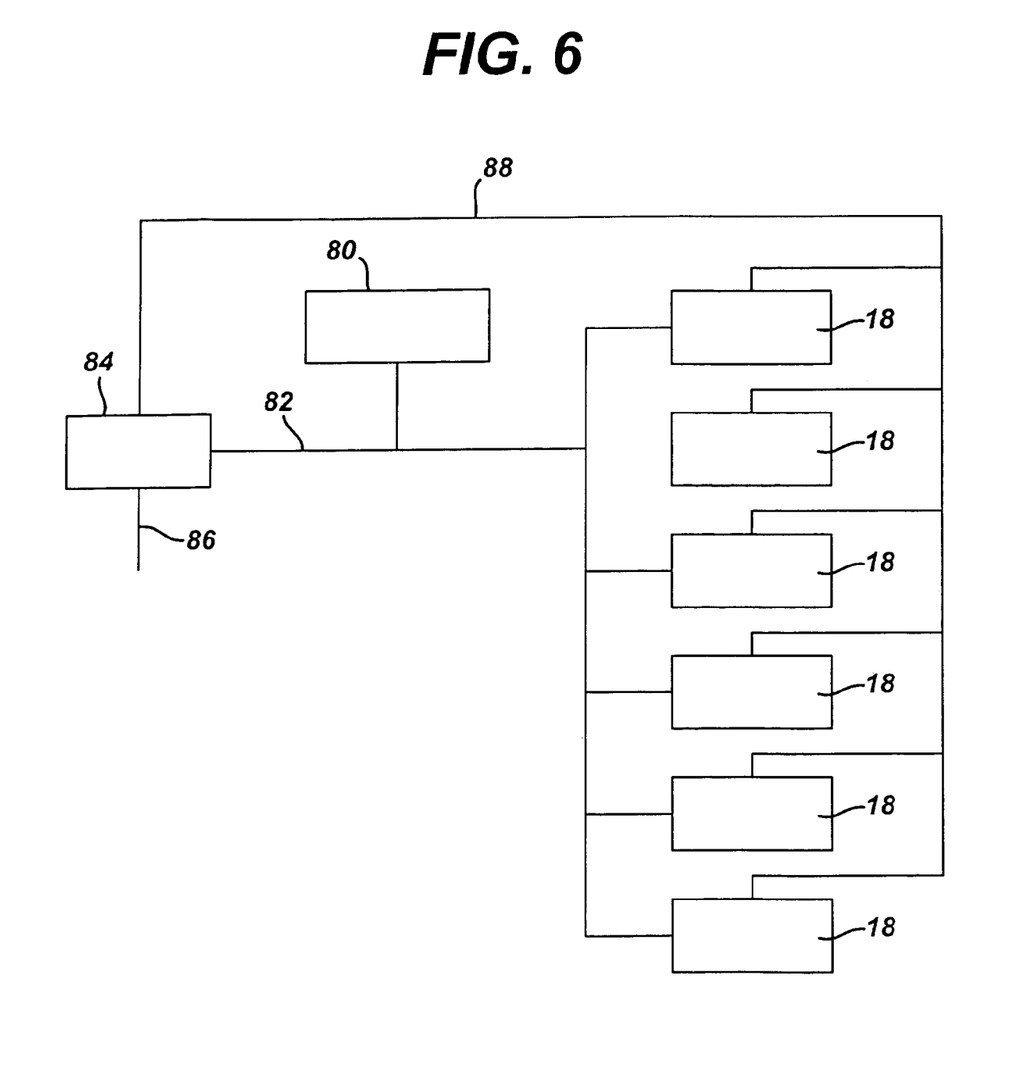
FIG. 6 is a schematic diagram of the pneumatic system of the preferred heat sealing apparatus.

Referring now to FIG. 6, in a currently preferred exemplary embodiment, one pressure transducer 80 is used to measure the pressure that is applied to each cylinder or lift 18. Each cylinder 18 is adjustable between an up position and a down position dependent upon the position of a three-way valve 84. Three-way valve 84 receives fluid pressure from a conventional source (not shown) via source conduit 86. Valve 84 connects fluid line 86 with either cylinder up conduit line 82 or with cylinder down conduit line 88. It is noted that the pressure transducer 80 is tapped into pressure line 82 to determine the pressure applied by all cylinders 18 when they are in the up position. An alarm (not shown) is activated if the detected pressure is not within a predetermined range. If the alarm is activated the array of packages, which were in the heat sealer, are tracked for discard by the control system.

Lidstock 26 can be provided with a lid registration mark 38, which can be sensed by an optical sensor assembly within the heat cylinder assembly to ensure that the lidstock 26 is properly positioned within the heat seal assembly. Registration mark 38 can be an aperture or transparent portion of the lidstock, such that an optical signal from an optical transmitter 41 of the sensor assembly is received by an optical detector 40 only when the aperture is aligned with the optical signal path defined between the transmitter and receiver. In place of the optical sensor assembly within the heat seal apparatus 10, registration of the lidstock may be done elsewhere, and the gripping arms 28 and 30 of the lidstock maneuvering mechanism may be arranged to reliably maneuver the lidstock to a predetermined location in proper registration with the platen 16 and, thus, with the carriers 14. Because the lidstock is preferably held during the heat seal step the alignment preferably does not need to be checked after sealing.

Figure 7:
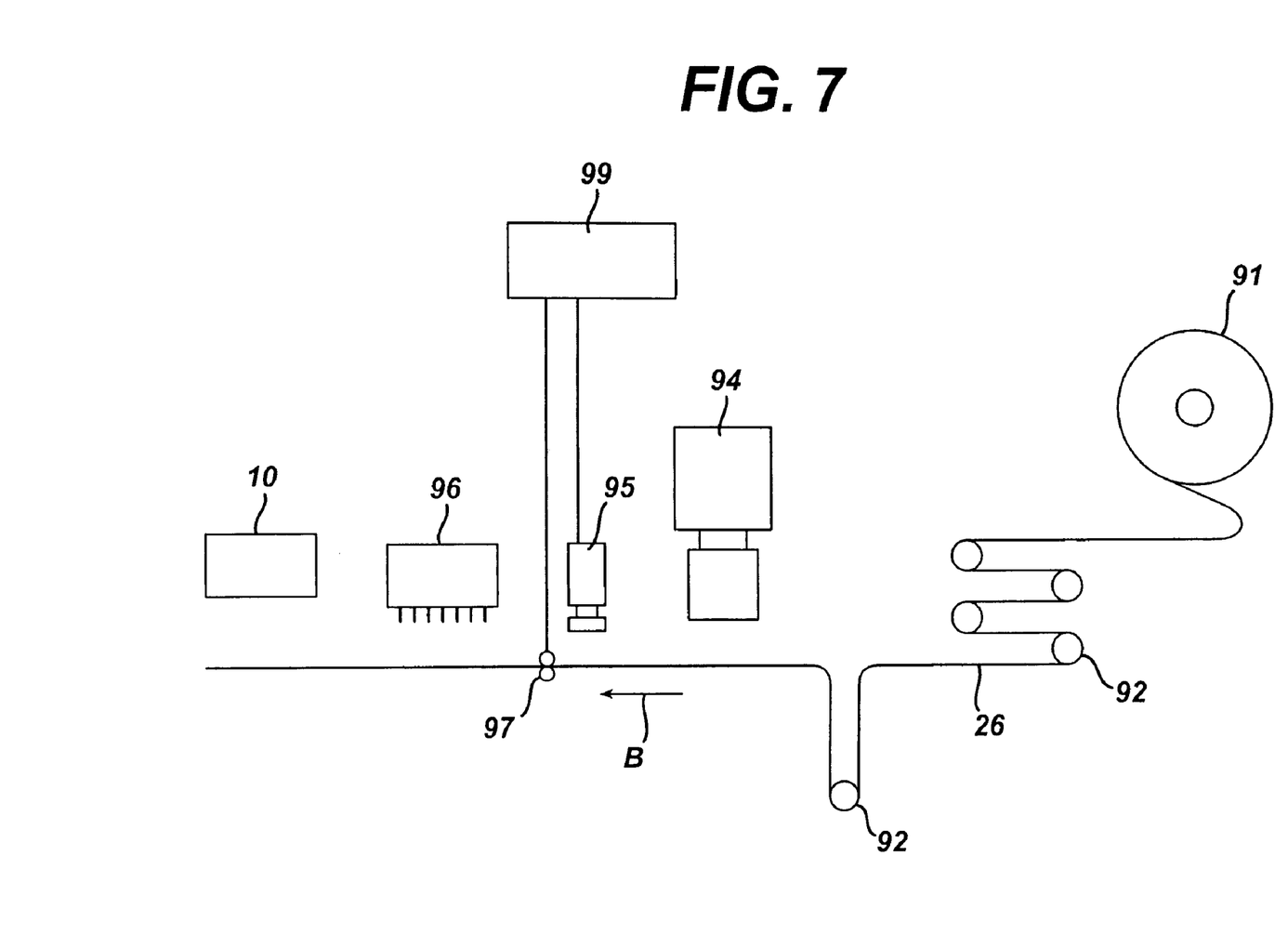
FIG. 7 is a side view of the movement of the lidstock prior to the heat seal apparatus.

In the preferred embodiment, in the steps before the lidstock is placed over the containers in the heat seal apparatus, the lidstock (which preferably has most of the graphics pre-printed on it) has some variable product information printed on it, e.g., the power, lot and expiration date of the product and the lidstock is cut and perforated into strips according to the number of containers to be heat-sealed into an array. The printing on the lidstock can be done by any known method, including laser printing or thermal printing, preferably by laser printing. The preprinted graphics on the lidstock preferably provide areas in which this information is to be printed, e.g., blank colored boxes. In the preferred embodiment, shown in FIG. 7, a strip of lidstock 26 is fed off a roll 91 under constant tension through lidstock buffers 92 in the direction shown by arrow B to the printing system 94, and to the cutting or cutting and perforation system 96 which are located in a line. Preferably, between these two operations is located a vision system 95 which uses a portion of the graphics on the lidstock 26 to check the registration of the lidstock. If, when the strip of lidstock 26 is fed into the printing system 94 and cutting and perforation system 96, the portion of the graphics is not in its proper location, the vision system 95 communicates to the control system 99 for the process that the lidstock is not in the correct location and the control system 99 instructs the lidstock feed rollers 97 to adjust the position of the lidstock either in the plus or minus direction. By the use of the vision system 95 the lidstock 26 is continuously checked and automatically realigned. The vision system 95 can be located before and/or after the printing system 94, and/or within the cutting and perforation system 96, and/or in the heat-seal apparatus 10. However, in the preferred embodiment, there is only one vision system 95, e.g., an optical character verification system with location capability, and it checks the laser printing quality at the same time it checks the registration; therefore, it is preferably located after the printing system 94. By locating the printing system 94 and the cutting and perforation system 96 in a line in which the lidstock 26 is taut between them and under constant tension, the registration of the lidstock 26 by the vision system 95 maintains registration in both systems. Further, in the preferred embodiment, by carefully controlling the lidstock 26 during the cutting and printing steps and by holding the lidstock until the mandrel 32 contacts the lidstock 26 in the heat-sealing apparatus 10, checking the registration of the lidstock within or after the heat-sealing apparatus 10 is not necessary, and in the preferred embodiment is not done.

Further, in the upstream conveyor 12, a conventional inspection system may be used to ensure that a proper or non-defective lens has been placed within each container 24. In the preferred embodiment, the detection system described in commonly assigned U.S. patent application Ser. No. 09/187,579 filed Nov. 5, 1998, entitled "Missing Lens Detection System and Method", VTN-423, the disclosure of which is hereby fully incorporated by reference, is upstream of the heat seal apparatus. If either a conventional inspection system or the preferred detection system is used, if an improper or defective lens has been placed within container 24, or, for example, if no lens has been placed within container 24, the carrier 14 supporting the container can be removed from the assembly line (i.e., from conveyor 12) downstream of the inspection station by a discarder arm 61 or the like, which is preferably controlled by the computer for the process acting on information from the detection system or inspection system. An acceptable lens-containing container on a carrier can then be automatically moved into the empty position left by the removed carrier before the individual lens carriers 14 are moved into position before or in the heat seal assembly 10. A device for automatically inspecting contact lenses is described in U.S. Pat. No. 5,687,541 to Martin et al., incorporated herein by reference.

Figure 5:
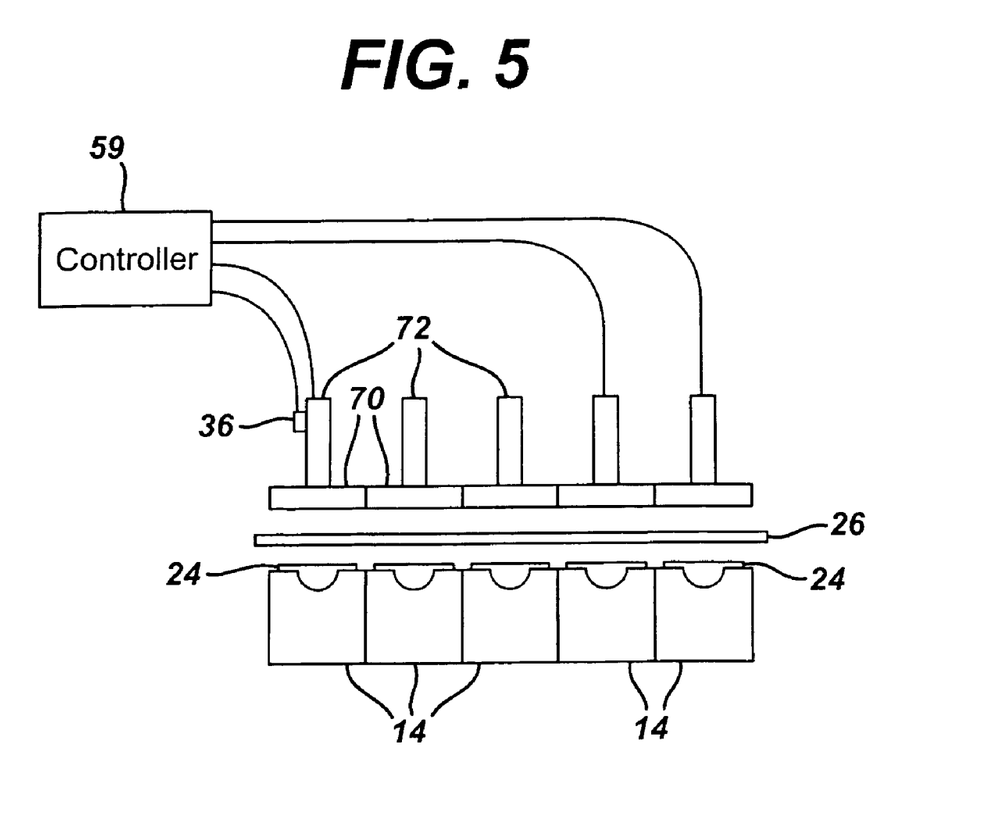
FIG. 5 is a side view of another embodiment of the present invention.

In another embodiment, the heated mandrel 32 may comprise plural individually actuated dies 70 (FIG. 5) controlled by individual die cylinders 72, each of which individually applies pressure to portions of the lidstock 26 and to a corresponding one of the containers 24 housed in the carriers 14. In this embodiment, the cylinders 18 engaged to the corresponding platens 16 are replaced by the die cylinders 72, and the platen 16 may be a conventional, single base supporting all of the carriers or a single carrier holding multiple containers to be heat sealed. The pressure in the die cylinders can be monitored by one or more pressure transducers 36 as described above in connection with FIG. 2 or FIG. 6 and the controller 59 can be responsive to receipt of electrical signals from the respective transducers to control the individual die cylinders 72 to maintain the pressure applied to each of the packages within the predetermined range, or if the pressure is outside a set range the arrays can be tracked for discard. Again, it is preferable to hold the lidstock in place over the containers until the mandrel is moved to the engaging position causing the lidstock to contact the containers.

In another aspect of the invention, there is provided an embodiment that allows for variances in the heat seal area of a package by providing means that allow the heat seal apparatus to be flexible to the pitch or yaw in the plastic in the heat seal area.

In the embodiments of the invention described earlier, the heat seal apparatus positions the carriers carrying the containers under the mandrel. The mandrel preferably comprises one or more heat seal dies that are mounted on the heat sealing apparatus and are used to seal the lidstock to one or more containers. The containers are located under the mandrel so that each container is aligned with a corresponding heat seal die. In the embodiments previously described, sometimes it is difficult to maintain the surface of the heat seal die and the surface of the platen onto which the carrier is mounted exactly parallel to each other which will negatively impact the sealing of the lidstock to the container. The embodiment shown in FIGS. 8–13 provides a heat seal apparatus comprising one or more compliant heads. The heat seal apparatus 100 comprises an upper portion 330 and a lower portion 290. The upper portion comprises a heated mandrel 132. The lower portion comprises a compliant head 291 comprising a platen 116, that allows each platen 116 (and therefore the container on each platen) to move limited distances preferably in the horizontal, vertical, pitch and yaw directions so that the surface 233 of the heat seal die 234 that contacts the lidstock on each container and the surface 296 of each platen that carries each container are parallel to one another. This provides for the most consistent and reliable sealing of the lidstock to the container.

Figure 12:
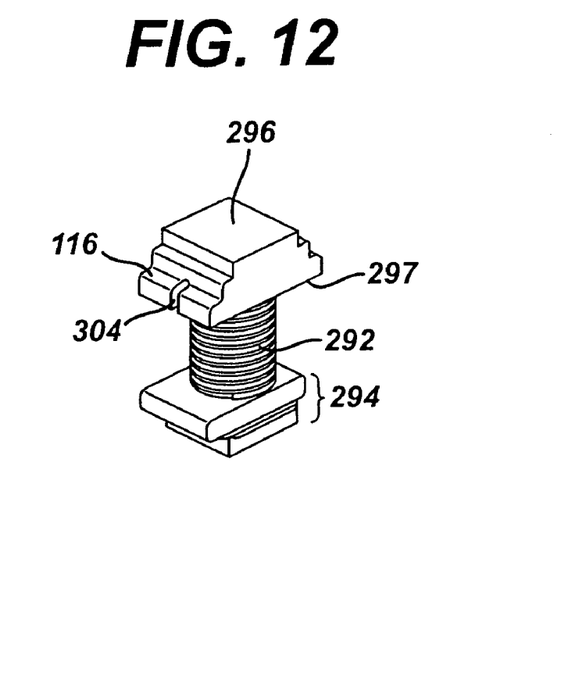
FIG. 12 is a side view of a portion of the compliant head.

Each compliant head 291, shown individually in FIG. 12, comprises a platen 116 and movement means that provides for the movement of the platen during use so that the surface of the platen and the surface of the sealing die are aligned and preferably parallel to one another. The movement means as shown in FIGS. 10, 11, 12 and 13 is a spring 292 one end of which is preferably attached to the platen 116, preferably at the surface 297 of the platen 116 opposite the carrier contacting surface 296 of the platen 116. The spring can be attached to the platen (and/or the platform) via a boss in the inside diameter at the ends of the springs, or by welding, fasteners, or any way known to a persons of ordinary skill in the art. Alternative means that provides movement of the platen could be a shock, e.g. gas shock, and a ball bearing to support the platen. The compliant head 291 preferably also comprises a platform 294 to which the other end of the spring 292 is attached. Each compliant head 291 is preferably constructed as a separate part so that if a compliant head wears or is defective it can easily be removed from the lower portion of the sealing apparatus 290 and replaced.

Each compliant head 291 is attached to a support 299 via a screw 293. Preferably screw 293 is a fine threaded adjustment screw that is preferably also used to pre-load the spring that is to compress the spring. The compliant head is calibrated such that for a given compression distance (preferably 2 mm,) the desired force is achieved (preferably 400–500 lbs depending upon the shape of the package.) The spring 292 must be designed so that it is in its elastic range within the required deflection. This will typically yield millions of cycles before failure.

The compliant head 291 preferably further comprises means to hold the spring in a compressed state. The means to maintain the spring in a compressed state comprises upper lips 301 that are attached to side supports 300. The side supports are located on opposite sides of each compliant head 291 and attached to support 291. The lips 301 constrain the platens 116 and define the maximum vertical position of the platens (the compliant head), and with the support 299 are means to maintain the spring under constant compression. When the compliant head is mounted onto the support and between the side supports, preferably the spring is under a compression force.

Figure 13:
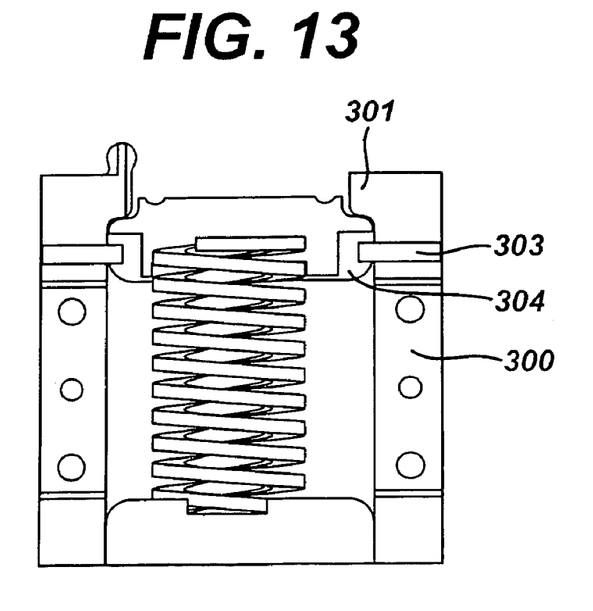
FIG. 13 is a partial cross-sectional view of a portion of the compliant head.

In the preferred embodiment as shown in more detail in FIG. 13, in addition to the movement of the platen by the vertical compression of the spring, movement of the platen can be any direction; however additional means to limit this movement are preferably provided. In the preferred embodiment, as shown in FIG. 13, the means to limit the movement are the lips 301, and one or more pins 303 that are attached to or are part of side supports 300 that are received into one or more slots 304 in each platen 116,. As shown each side support 300 has a pin 303 for each platen 116, and each platen 116 has two slots 304 on opposite sides to receive the pins 303. The pins 303 and slots 304 are sized to allow the platens to tip back and forth, and to pivot left and right. In use when the platen of the compliant head carrying a container is in pressurized contact with a lidstock and the surface 233 of the heat seal die 234, the platen and therefore the container and lidstock conform to the plane of the surface 233 of the heat seal die 234. As shown the platen 116 and the contacting surface 233 of the heat seal dies 234 can be up to 0.3 mm from parallel prior to contact, and when in contact the compliant head will allow the platen to move in an angular direction to provide for planar alignment of surfaces 296 and 233 during the process of heat seal.

Figure 14:
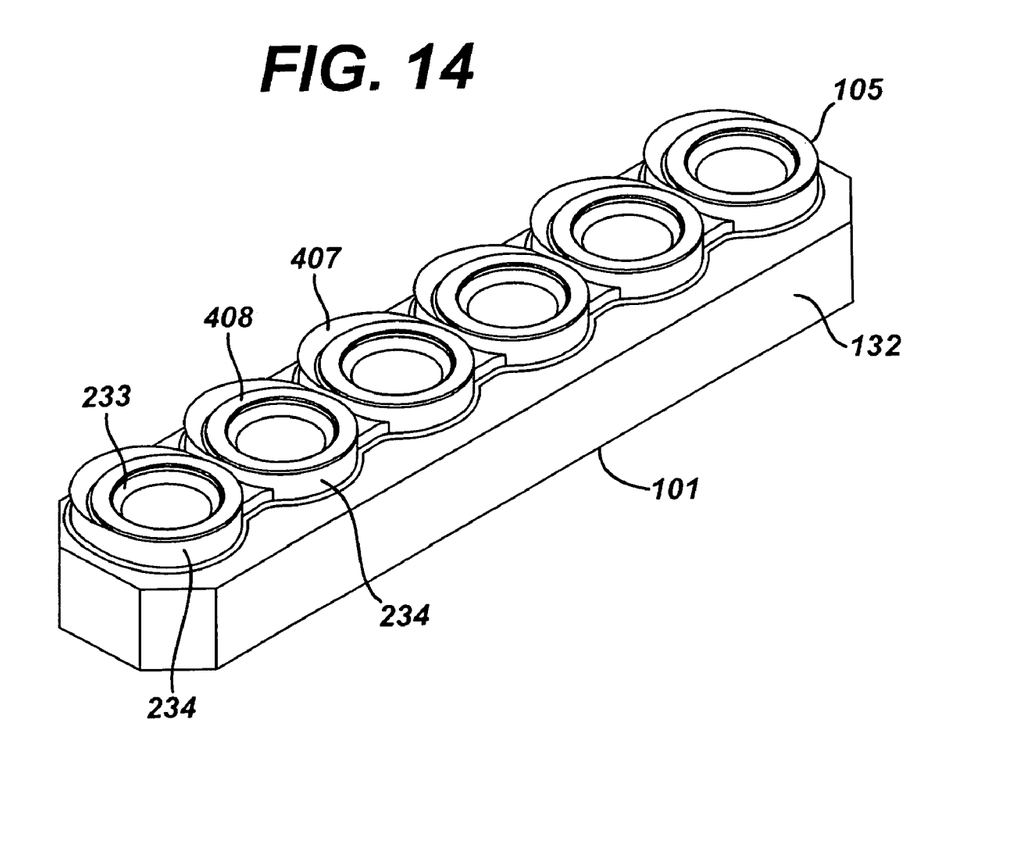
FIG. 14 is a side perspective view of a heat seal die block useful in this invention.

The preferred mandrel is a heat seal die block 101 as shown in FIG. 14. The heat seal die block 101 comprises heat seal dies 234 that comprise a raised area 105 the surface 233 of which when in use, contacts, beats, and presses the lidstock against and into the sealing flange 39 which is preferably a raised area on the surface of the container 24. As shown in FIG. 14, the raised circular area 105 is useful to adhere lidstock 26 to a round sealing flange 39, similar to the one shown in FIG. 3.

When the compliant heads are assembled, it is preferred that the springs are used within their working elastic region and the springs can be designed to be repeatable in force for a given distance. When in use, the platen will be compressed a known distance; therefore, the screw can be used to adjust the preload on the spring until the force requirement is met. Each spring is calibrated in this way to provide the same compression force and provide for repeatable deflection.

Figure 8:
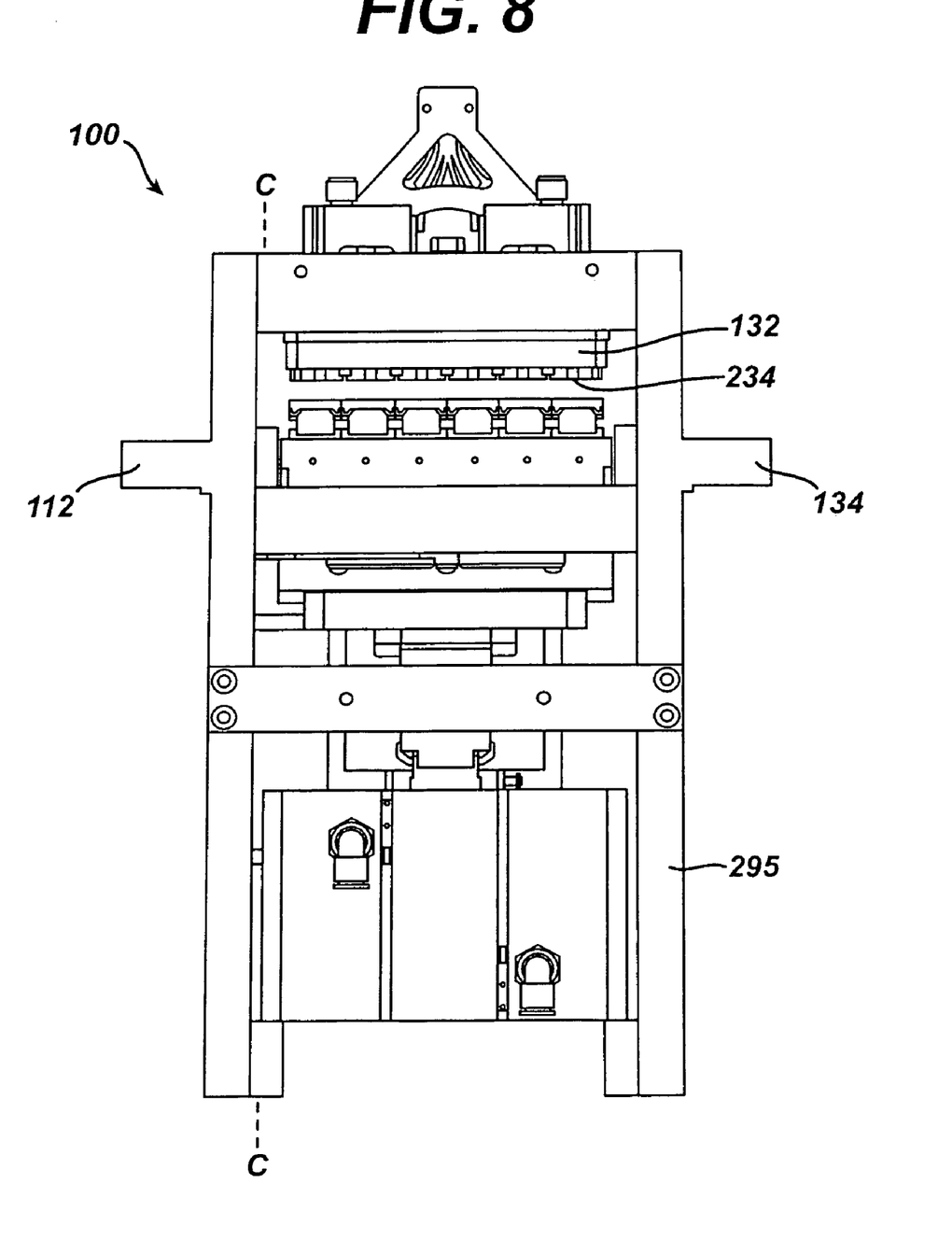
FIG. 8 is a front view of another embodiment of the invention.
Figure 9:
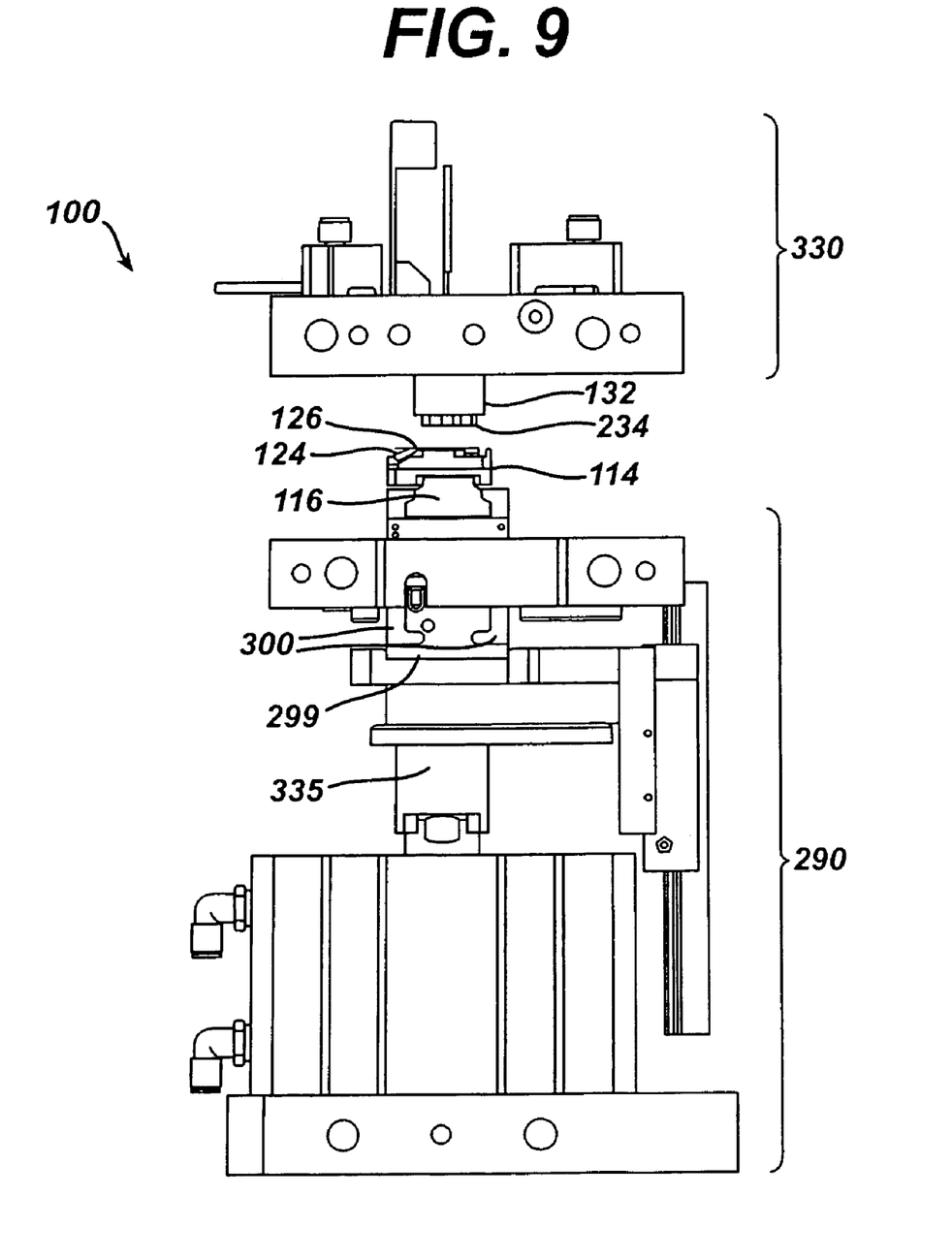
FIG. 9 is a cross-sectional view of the embodiment shown in FIG. 8 taken along the line c—c shown in FIG. 8.
Figure 10:
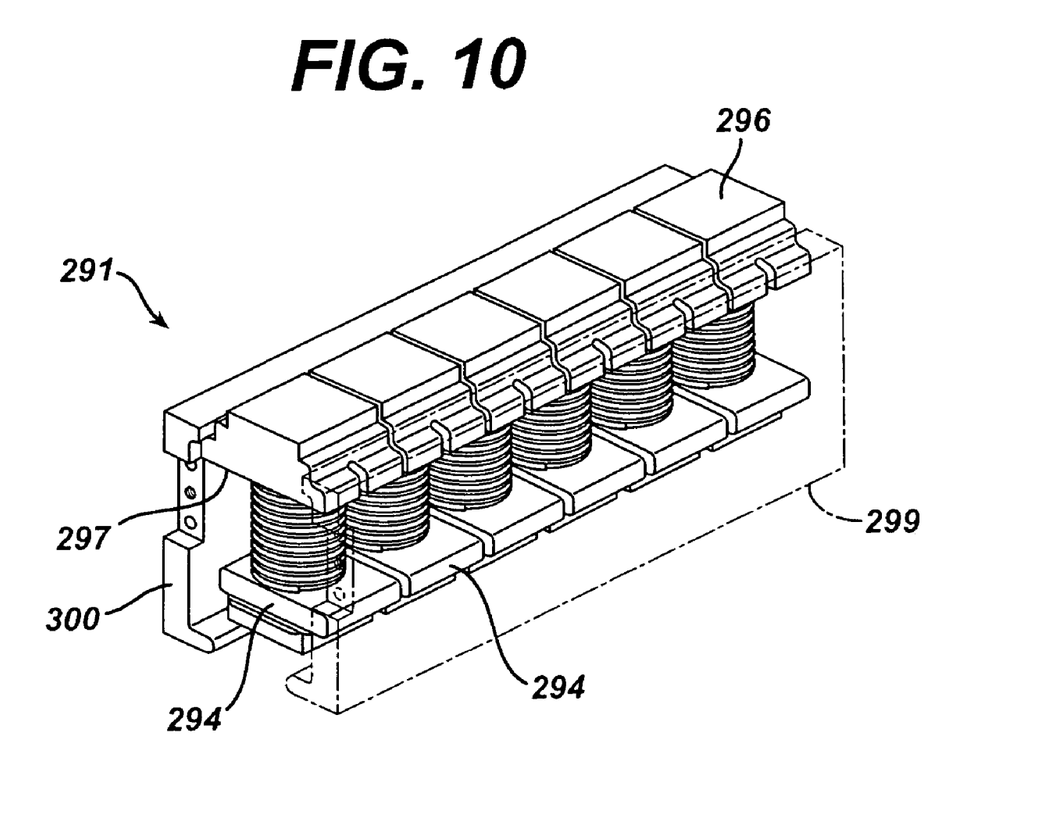
FIG. 10 is a partial side perspective view of a compliant head useful in the embodiment of this invention shown in FIGS. 8 and 9.
Figure 11:
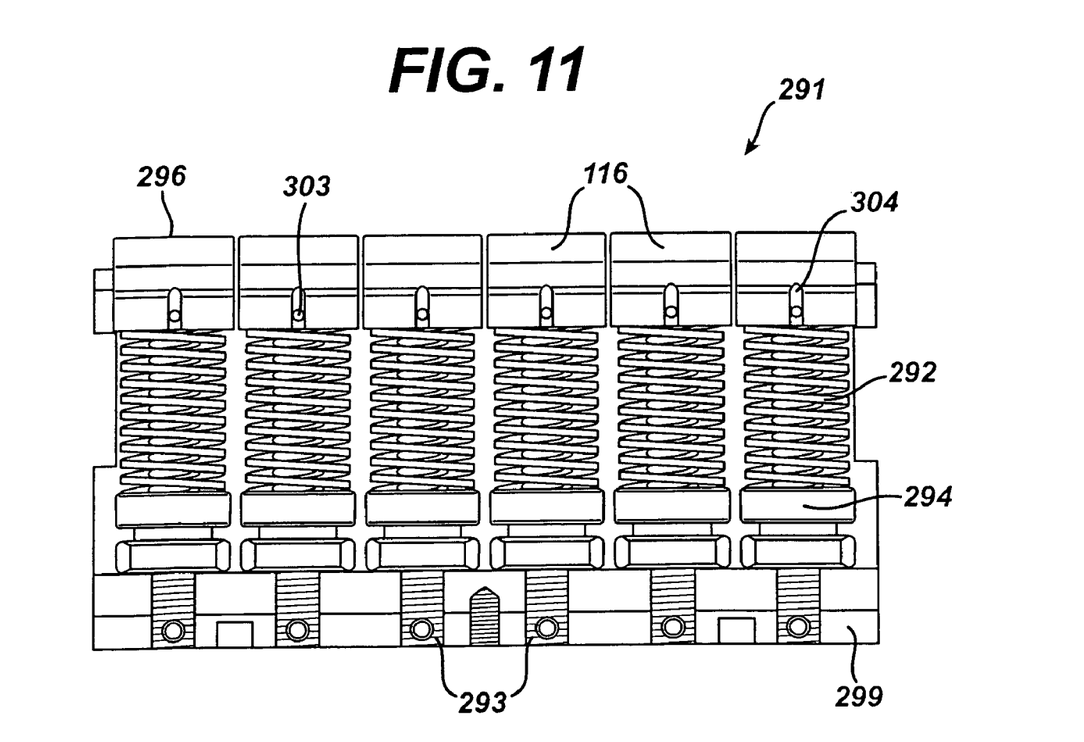
FIG. 11 is a side view of the compliant head shown in FIG. 10.

In the preferred embodiment shown in FIGS. 8 and 9, the lower portion 290 comprises the means to move the upper portion and the compliant head into contact with the container between the platen and the heat seal dies 234. In an alternative embodiment the upper portion could be provided with means to move the upper portion into contact with the lower portion. As shown, the means are a single lift 335 that operates on the support 299 to move all six compliant heads mounted on the support upwards into contact with the mandrel 132 of the upper portion 330. The lift 335, e.g., a hydraulic or pneumatic (i.e., fluid) cylinder preferably a pneumatic cylinder, more preferably an air cylinder, most preferably an air cylinder having a large bore. The upper portion is attached to stationary frame 295. The lower portion 290 is also attached to the same frame 295. The compliant head is movably attached via the lift 335 to the frame 295. The compliant head moves vertically when moved by the lift 335. The lift is attached to the compliant bead by bolting the lift to the support 299.

In operation, the compliant head carrying the containers is moved by the lift into contact with the mandrel. Preferably the compliant head is overdriven to a dead stop at a point that will force the springs to be compressed a required distance, approximately 1–2 mm. In this way minor fluctuations in the lift's pressure will not detrimentally impact the seal of the lidstock to the container. Therefore, if the lift is brought to a stop short of the lift's driving limit, the springs in the compliance head are compressed the required distance against the manifold, and any force in excess of that required by the springs would be absorbed by the dead stop. In this way we have a finely controlled and calibrated force (the springs) and a main driving force which is very robust (the lift, a cylinder) which drives the calibrated force to its calibrated position. At the point at which the springs are compressed, the compliant heads can each adjust themselves horizontally, vertically and in the pitch and yaw directions to be parallel to the mandrel. In this way the plane of the container and the plane of the heat seal die will be parallel or differ by less than 2 degrees from parallel.

This embodiment is an improvement over the other embodiments, because it provides individual compliance in multiple directions, vertically, horizontally, and angularly in the pitch and yaw directions. Another benefit is that maintenance is simplified by decreasing the number of lifts or air cylinders, which sometimes have failure of seals or variances in airline pressure. However, the compliant heads of this invention can be used in the previously described embodiments having multiple lifts to provide additional compliance to those embodiments. The compliant heads described and shown herein could be attached to individual lifts, instead of to a support and a single lift as described above.

Further, the compliant head could be used as the mandrel with individual heat seal dies attached to each compliant head instead of individual platens as described and shown above. Either the upper or lower portions or both portions of the heat sealing apparatus could be moved by one or more lifts (and individual lifts for each heat seal die, if desired) as described above to overdrive the springs in the compliant head to provide proper alignment of the heat seal dies and the platens (containers).

In this embodiment it is preferred to use high-pressure to yield much faster seal times, improved seal integrity, and minimal skinning (a negative condition apparent when opening a primary package leaving the plastic substrate of the foil attached to some extent on the primary package. The force is preferably greater than 350 lbs.

Another aspect of this invention is the provision of an improved heat seal die that provides improved thermal characteristics. The heat seal die of this invention maintains its temperature very close to the temperature necessary to heat-seal the lidstock to the container at all times, even just after a heat-sealing step. In the preferred embodiment this temperature is approximately 200–240° C. In earlier embodiments, there was a lag time of greater than 3 seconds between sealing packages to provide time for the heat seal die to heat up to a temperature necessary for heat-sealing. To attempt to decrease the lag time, more conductive materials were used for the heat seal die; however, the conductive materials are expensive and easily damaged.

In this invention, an advanced wafer heater that has very high wattage (developed and marketed by Tayco Engineering for use in the aerospace industry) is used to heat the heat seal dies. By using direct application of the wattage needed to seal the package rather than the thermal momentum of the die, the heat seal dies are maintained at the necessary temperature, and the lag time for the heater to increase the temperature of the heat seal die is decreased significantly to less than 1 second. Additionally, because the heater is so efficient, it allows for the use of a heat seal die material that is best suited for a manufacturing environment, that is stainless steel, more preferably hardened stainless steel. The stainless steel die is very durable.

The improved heater also overcomes the negative impact that energy wicking has on the heat seal when the lidstock that is heat sealed comprises a foil layer. When the shape of the lidstock having a foil layer is not equal on all sides surrounding the shape of the heat seal die there is uneven wicking away of heat from the heat seal die by the lidstock. More energy is wicked away where there is more foil, causing the resulting seal of the lidstock to the container to be "lighter" where substantial heat was wicked away. Prior to this invention to compensate for this, the package has been sealed to provide sufficient seal on the side with more foil which has resulted in over-sealing the side with less foil. This has caused problems with skinning and other difficulties when opening packages.

To overcome this problem, the heat seal dies can be modified to even out the energy by providing an extra thermal mass to the heat seal die in the areas of the heat seal die that will contact the lidstock where there is a greater amount of foil to wick the heat away from the heat seal die. To determine how much mass to provide to the heat seal die, the efficiency of the heater (any heater), and the amount of foil (available to wick heat away from the heat seal die) around the area of the lidstock that the heat seal die will contact, and the thermal conductivity of the heat seal die material and foil must be considered. FIG. 14 shows the thermal mass 407 useful for providing more energy from the heater (not shown) into the side 408 of the heat seal die 234 that contacts the lidstock with a bigger area of foil available to wick the energy from the heat seal die which results in an even seal of the lidstock to the container.

Having described the presently preferred exemplary embodiments of an apparatus for automatically packaging contact lenses in accordance with the present invention, and related inventions, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

What is claimed is:

1. An apparatus for packaging contact lenses in a plurality of contact lens containers, each container having a recess, a sealing flange about said recess, and a contact lens within said recess, a plurality of said containers being sealed in said apparatus to a contiguous lidstock to form a set of packages, said apparatus comprising:
   a platen in a lower portion of the apparatus, said platen comprising a compliant head that is compliant in more than one direction, said platen capable of supporting a plurality of carriers;
   a plurality of discrete carriers, said carriers being movable within said apparatus onto said platen so that said carriers are located adjacent to one another, each carrier adapted to carry one said container;
   a lidstock maneuvering system for placing lidstock over a plurality of said containers; and
   a plurality of lifts;
   a plurality of movable mandrels disposed above said platen; each of said mandrels being individually supported by one of said lifts and such that each of said carriers is located below each of said mandrels;
   whereby pressure is applied to said lidstock and said flange of each said container between said mandrels and said platen by said plurality of lifts to adhere said lidstock to said containers.

2. The apparatus according to claim 1, wherein said lidstock has a thickness and said container has a thickness, and further wherein said mandrels are selectively movable between a retracted upper position and an engaged lower position to seal said lidstock to said containers, and wherein in said lower position, a pressure applied by said mandrels against said platen is maintained within a predetermined range by the respective lifts, thereby compensating for tolerance differences in the thickness of said containers and the thickness of said lidstock to ensure that an adequate seal is formed between said lidstock and each of said containers.

3. The apparatus of claim 2, wherein said lidstock is held in position by said lidstock maneuvering system between said mandrels and said platen until said mandrel contacts said lidstock.

4. The apparatus according to claim 1, further comprising a pressure transducer being connected to said lifts, and further wherein said lifts apply pressure to said containers within a predetermined range, as determined by said pressure transducer.

5. The apparatus according to claim 1 wherein said mandrel is heated.

6. The apparatus of claim 1, wherein said lidstock maneuvering system further comprises:
   a vision alignment inspection system having means for checking the print quality on said lidstock and for simultaneously checking for registration of said lidstock within said apparatus based on the location of said print.

7. The apparatus of claim 6, wherein said lidstock maneuvering system further comprises a printing system and a cutting system, wherein said lidstock is fed from a roll under tension into said printing system and said cutting system, and said vision alignment inspection system is located after said printing system.

8. The apparatus of claim 7, wherein said cutting system is located after said printing system.

9. The apparatus of claim 6, wherein said lidstock maneuvering system further comprises a printing system and a cutting system, wherein said lidstock is fed from a roll under tension into said printing system and said cutting system and said alignment inspection system is located between said printing system and said cutting system.

10. The apparatus of claim 6, further comprising a heat seal apparatus wherein said lidstock is mechanically controlled after said vision alignment inspection system to prevent misregistration of said lidstock in said heat seal apparatus.

11. The apparatus according to claim 1, wherein said compliant head is compliant in the vertical and horizontal directions.

12. The apparatus according to claim 1, wherein said compliant head is compliant in the pitch and yaw directions.

13. The apparatus according to claim 1, wherein each of said platens comprises a heat seal die, said heat seal die comprises a wafer heater capable of increasing the temperature of the heat seal die with a lag time of less than 1 second.

* * * * *